Figure 1:
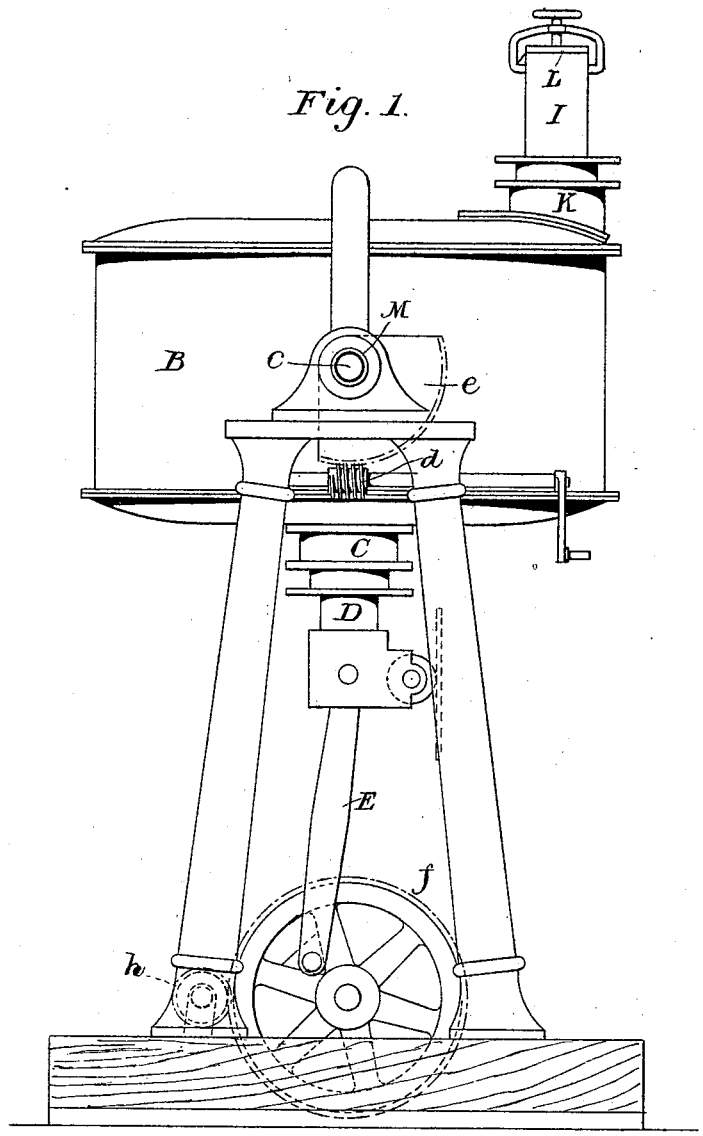

(No Model.) 2 Sheets—Sheet 1.

F. WEBB.
METHOD OF AND APPARATUS FOR EXTRACTING PRECIOUS METALS FROM THEIR ORES.

No. 495,385. Patented Apr. 11, 1893.

Attest:
Reev Lewis
Arthur A. Erb

Inventor:
Frederick Webb
by Robt D Mauro
his attorney.

(No Model.) 2 Sheets—Sheet 2.
F. WEBB.
METHOD OF AND APPARATUS FOR EXTRACTING PRECIOUS METALS FROM THEIR ORES.
No. 495,385. Patented Apr. 11, 1893.
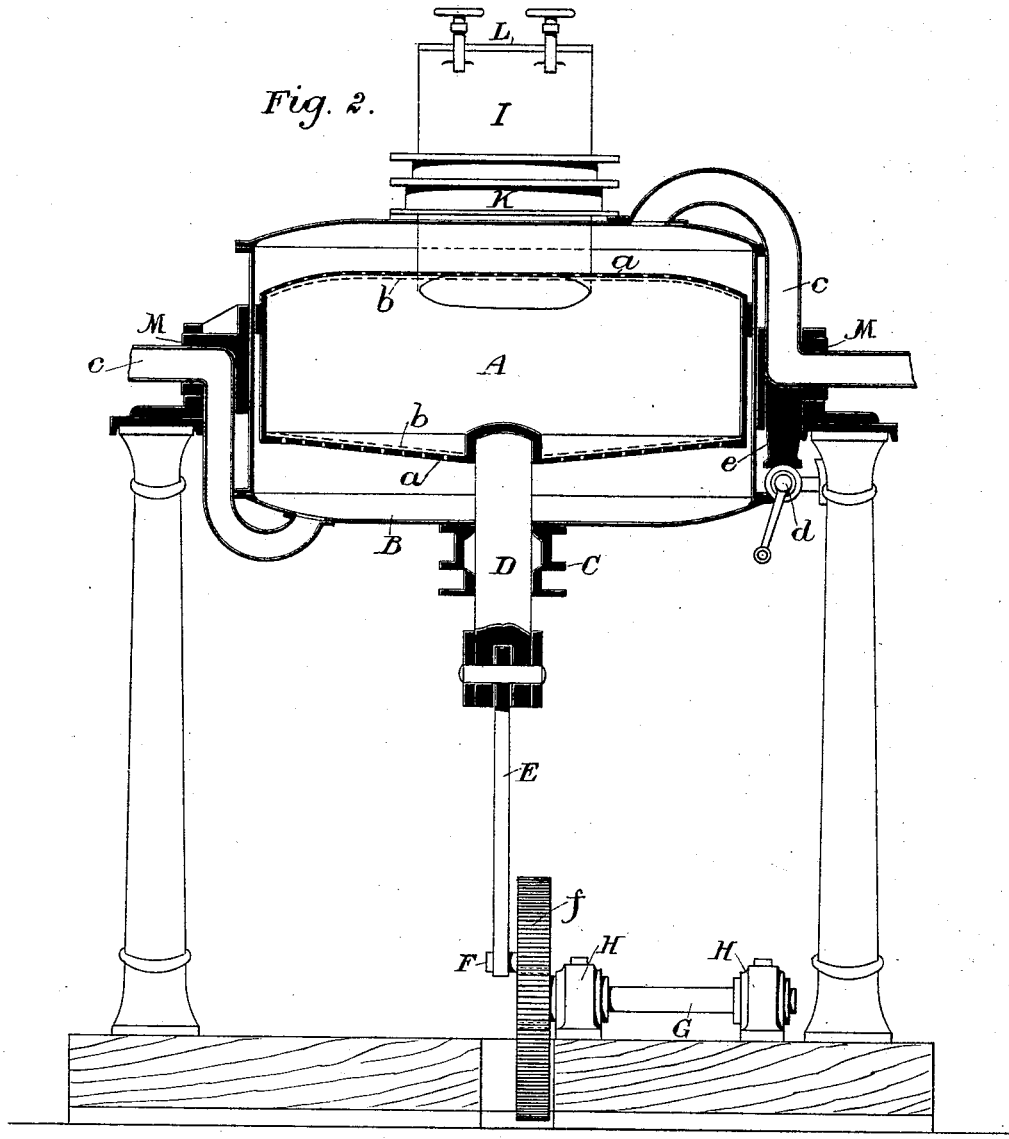

UNITED STATES PATENT OFFICE.

FREDERICK WEBB, OF BATTERSEA, ENGLAND.

METHOD OF AND APPARATUS FOR EXTRACTING PRECIOUS METALS FROM THEIR ORES.

SPECIFICATION forming part of Letters Patent No. 495,385, dated April 11, 1893.

Application filed August 29, 1892. Serial No. 444,469. (No model.)

*To all whom it may concern:*

Be it known that I, FREDERICK WEBB, engineer, a subject of the Queen of Great Britain and Ireland, residing at 83 Bridge Road, Battersea, in the county of Surrey, England, have invented certain Improvements in Methods of and Apparatus for Extracting Precious Metals from their Ores, of which the following is a specification.

My invention has for its object to provide simple and efficient apparatus for the extraction of precious metals from their ores by the use of chemical solutions, and consists of means whereby the ore from which the metal is to be extracted is caused to reciprocate to and fro in the solution in a loose or disintegrated condition the solution being thus enabled to act upon it more effectually than hitherto.

I will describe my invention with reference to the accompanying drawings premising however that I do not restrict myself thereto as variations may be made therein without departing from the nature of my invention.

Figure 1 is an elevation and Fig. 2 is a vertical section of an apparatus suitable for carrying out my invention.

A is a hollow vessel or piston fitted to slide or reciprocate inside an outer vessel or cylinder B provided with a stuffing box C through which the piston rod D passes. Reciprocation may be imparted to the said vessel or piston A by any suitable means. In the arrangement shown in the drawings the outer end of the piston rod D is connected by a rod E to a crank or eccentric pin F on a toothed wheel $f$ fast on a shaft G mounted in bearings H and driven by a pinion $h$ or otherwise from any suitable prime mover (not shown in the drawings) so as to impart the desired to and fro, or reciprocating, movements to the said hollow vessel or piston A. The upper side of the hollow piston A is provided with a tube or manhole I fitted to slide in a stuffing box K on the outer vessel or cylinder B and provided at its outer end with a close fitting cover L. The two opposite sides or ends $a$ of the piston A are perforated the said perforations being covered with filter cloth $b$.

The outer vessel or cylinder B is supplied with chlorine solution or other reagent for dissolving the precious metal by a pipe or pipes $c$ passing through hollow trunnions M on which the said vessel B can be turned.

The ore to be treated, after having been crushed to the desired extent, is preferably first mixed with water or liquid so as to form sludge and is then run into the hollow vessel or piston A through the tube or manhole I and when sufficient ore is fed thereinto the manhole cover is closed and fixed in position. The chlorine solution or other reagent is then passed preferably by being forced by means of a pump, or other suitable forcing device, through one of the pipes $c$ into the outer chamber B until it is sufficiently charged with the solution. The shaft G is then started rotating so as to impart through the rods D and E reciprocating motion to the piston A containing the ore. The reciprocating motions of the piston in the solution contained in the outer vessel B cause the ore to be thoroughly mixed therewith and the heavier portions with the precious metal to precipitate and concentrate at the lower part of the interior of the piston A and this facilitates the action of the chemical reagent or solution upon the metals. The reciprocating motions given to the piston are continued for the necessary time usually some hours, after which the solution is forced out of the vessel B and clean water is admitted to wash the ore in the piston A free from all solution containing precious metal. When the ore is sufficiently washed the water is forced from the vessel B to be treated with the solution previously run off in any suitable way for recovering the precious metal therefrom after which the connecting rod E is uncoupled and the cover L of the tube or manhole I is removed. The vessel B together with the piston A is then partially rotated on the trunnions M so as to cause the ore to pass from the piston A through the manhole I into any suitable receiver or onto the ground. The vessel B is then returned to its former position and the connecting rod E is coupled up as before the piston A being then ready to receive a fresh charge of ore through the manhole I for treatment as hereinbefore described.

The partial rotation of the vessel B on its trunnions may be effected by means of a worm $d$ and worm wheel or segment $e$ as shown or by any other suitable means.

Any desired number of vessels B with pistons A as described may be arranged side by side and made to communicate one with another by vulcanite or other suitable pipes connected to the pipes $c$ so that the solution may pass from one vessel to another in succession through the series, and be caused to circulate therethrough for any desired period. For treating ores containing gold, solutions of either chlorine, bromine, iodine, or potassium cyanide are suitable reagents to be employed.

Having now described and ascertained the nature of my said invention and in what manner the same is to be performed, I declare that what I claim is—

1. In means for extracting precious metals from their ores the combination of an outer vessel resting in suitable trunnions for containing the reagent or chemical solution and having inlet and outlet pipes communicating respectively with the top and bottom thereof through said trunnions, a perforated vessel in said outer chamber, and adapted to receive the crushed ore, and provided with a manhole opening extending to the outside of the latter, and means for reciprocating the inner vessel and for rotating the outer vessel on its trunnions, whereby the contents of the inner vessel may be discharged, substantially as described.

2. The herein described method of separating precious metals from their ore, consisting in placing the disintegrated or crushed ore in a closed perforated vessel and causing the latter to reciprocate in the reagent or chemical solution, whereby the latter is enabled to more effectually act upon the ore, substantially as described.

In testimony whereof I have signed my name to this specification in the presence of two subscribing witnesses.

FREDERICK WEBB.

Witnesses:
ALBERT DAVIS,
47 *Lincoln's Inn Fields, London, W. C.*
WM. JOHN WEEKS,
9 *Birchin Lane, London, E. C.*